United States Patent
Zhang et al.

(10) Patent No.: US 12,441,825 B2
(45) Date of Patent: Oct. 14, 2025

(54) FLUORINE-CONTAINING GRAFT COPOLYMER, AND PREPARATION METHOD AND USE THEREOF

(71) Applicant: SOOCHOW UNIVERSITY, Suzhou (CN)

(72) Inventors: Lifen Zhang, Suzhou (CN); Jiannan Cheng, Suzhou (CN); Zhenping Cheng, Suzhou (CN); Jinying Wang, Suzhou (CN); Xiulin Zhu, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 650 days.

(21) Appl. No.: 17/801,304

(22) PCT Filed: Jul. 16, 2021

(86) PCT No.: PCT/CN2021/106654
§ 371 (c)(1),
(2) Date: Aug. 22, 2022

(87) PCT Pub. No.: WO2023/272793
PCT Pub. Date: Jan. 5, 2023

(65) Prior Publication Data
US 2023/0312795 A1 Oct. 5, 2023

(30) Foreign Application Priority Data
Jun. 28, 2021 (CN) .......... 202110722042.6

(51) Int. Cl.
*C08F 259/08* (2006.01)
*C07D 249/04* (2006.01)
(52) U.S. Cl.
CPC .......... *C08F 259/08* (2013.01); *C07D 249/04* (2013.01)

(58) Field of Classification Search
CPC .... C07D 249/04; C08F 259/08; C08G 81/025
See application file for complete search history.

(56) References Cited

U.S. PATENT DOCUMENTS 6,096,827 A * 8/2000 Lee .................. C08F 290/046
526/279
2011/0218305 A1 * 9/2011 Hintzer .................. C08G 73/00
528/392

(Continued)

FOREIGN PATENT DOCUMENTS

CN 102164970 A 8/2011
CN 110156647 A 8/2019

(Continued)

*Primary Examiner* — Mark S Kaucher
(74) *Attorney, Agent, or Firm* — SZDC Law PC

(57) ABSTRACT

The invention provides a fluorine-containing graft copolymer, and a preparation method and use thereof. The method includes the following steps: under a protective atmosphere, reacting a compound of Formula (I) and a compound of Formula (II) in a first organic solvent in the presence of a catalyst and a ligand at 20-30° C., to obtain the fluorine-containing graft copolymers of Formula (III) after complete reaction. The compounds of Formulas (I) and (II), and the fluorine-containing graft copolymer of Formula (III) have a structural formula shown below:

(I)

(II)

(Continued)

-continued (III)

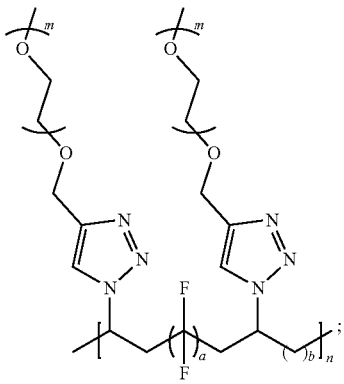

and the compound of Formula (II) comprises a polyethylene glycol segment and a terminal alkynyl group, wherein a=4-8; b=6-8; n=1-20; and m=3-22. In the present invention, a graft copolymer of a main-chain-type "semi-fluorinated" alternating copolymer is obtained for the first time by post-polymerization modification using a reactive functional group contained in the main-chain-type "semi-fluorinated" alternating copolymers.

10 Claims, 10 Drawing Sheets

(56) References Cited

U.S. PATENT DOCUMENTS

| | | | |
|---|---|---|---|
| 2016/0304633 A1* | 10/2016 | Hintzer | C08F 4/00 |
| 2020/0407475 A1* | 12/2020 | Sletten | C08J 3/243 |
| 2021/0403612 A1* | 12/2021 | Cheng | C08F 4/34 |

FOREIGN PATENT DOCUMENTS

| | | | | |
|---|---|---|---|---|
| CN | 110092914 B | * | 3/2021 | C08G 81/00 |
| WO | 2019099884 A1 | | 5/2019 | |

\* cited by examiner

FLUORINE-CONTAINING GRAFT COPOLYMER, AND PREPARATION METHOD AND USE THEREOF

This application is the National Stage Application of PCT/CN2021/106654, filed on Jul. 16, 2021, which claims priority to Chinse patent application No. 202110722042.6, filed on Jun. 28, 2021, which is incorporated by reference for all purposes as if fully set forth herein.

FIELD OF THE INVENTION

The present invention relates to the technical field of polymer preparation, and particularly to a fluorine-containing graft copolymer, and a preparation method and use thereof.

DESCRIPTION OF THE RELATED ART

Fluoropolymers, due to their excellent hydrophobic and oleophobic properties, thermal stability, low refractive index and low surface energy, has a huge market of applications, for example, in functional coatings, biomedical facilities, thermoplastic materials, and fuel cell membranes, etc. All these are closely related to the presence of fluorine atoms having strong electronegativity and low polarizability. Depending on the position of the fluorine-containing segment, the fluoropolymers can be divided into main-chain-type fluoropolymers and side-chain-type fluoropolymers.

With the development of various reversible deactivation radical polymerization (RDRP) methods, controllable synthesis of fluoropolymers is greatly facilitated. However, most fluorinated monomers (especially olefin monomers) are gases at room temperature, specially designed reactors (autoclaves) are required to carry out polymerization reactions involving these monomers. Moreover, the varieties of the monomers are relatively fewer, and mainly fluorine-containing olefin monomers and acrylate monomers.

According to the topological structures, the fluoropolymers can be further divided into linear fluoropolymers, grafted fluoropolymers, star-shaped fluoropolymers and dendritic fluoropolymers, etc. As for the chemical structure of the polymer chain, the properties of the polymers are closely related to their compositions in chain structures. Therefore, the design of the position of the fluorine-containing segment and the topology of the fluoropolymer will be beneficial to the further widening of the types of the fluoropolymers and their application scope.

The Chinese Invention Patent Publication No. CN108707236A discloses a method for preparing a graphene oxide grafted fluoropolymer by reacting an iodofluoropolymer with sodium azide to obtain a fluoropolymer having an azido group, and then reacting the fluoropolymer having an azido group with acetylized graphene oxide. The method has significantly improved grafting rate, and simple preparation process, thus being suitable for industrial production. The prepared material comprising graphene oxide grafted fluoropolymer has the characteristics of high tensile strength, good thermal stability, and high mechanical strength. However, in the prepared graphene oxide grafted fluoropolymer, the grafted segment is graphene oxide, which is not hydrophilic, and cannot be used as a surfactant.

The present inventors have recently developed a novel step transfer-addition & radical-termination (START) polymerization method by visible light-induced catalytic polymerization of α,ω-diiodoperfluoroalkane (monomer A) and α,ω-non-conjugated diene (monomer B). Through the structural design of the non-conjugated diene monomer B, novel "semi-fluorinated" alternating copolymers $(AB)_n$ with diverse polymer structures and adjustable molecular weight can be obtained (note: because the monomer A in this type of alternating copolymers is a perfluorocarbon monomeric unit, such copolymers are called "semi-fluorinated" alternating copolymers, in order to distinguish them from other types of fluoropolymers, where n represents the degree of polymerization). This opens up a new idea and provides a feasible polymerization method for solving the above-mentioned existing problem of fewer varieties of fluoropolymers.

To make full use of the excellent properties of fluoropolymers, new fluoropolymers of various topologies are synthesized with such unique novel "semi-fluorinated" alternating copolymer $(AB)_n$ as the building blocks, which can not only open up a new research direction, but also set foundations for the study of the performances and potential applications of the fluoropolymers.

SUMMARY OF THE INVENTION

To solve the above technical problems, an object of the present invention is to provide a fluorine-containing graft copolymer, and a preparation method and use thereof. In the present invention, a graft copolymer of a main chain type "semi-fluorinated" alternating copolymer is obtained for the first time by post-polymerization modification using a reactive functional group contained in the main chain type "semi-fluorinated" alternating copolymer.

A first object of the present invention is to provide a method for preparing a fluorine-containing graft copolymer. The method comprises the following steps:

under a protective atmosphere, reacting a compound of Formula (I) and a compound of Formula (II) in a first organic solvent in the presence of a catalyst and a ligand at 20-30° C., to obtain the fluorine-containing graft copolymer of Formula (III) after complete reaction. The compounds of Formulas (I) and (II), and the fluorine-containing graft copolymer of Formula (III) have a structural formula shown below:

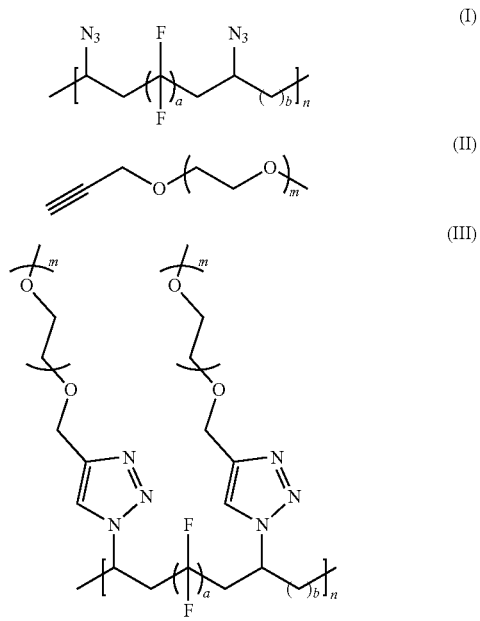

the compound of Formula (II) comprises a polyethylene glycol segment and a terminal alkynyl group,
wherein a=4-8; b=6-8; n=1-20; and m=3-22. Preferably, m=3, 6, 9 or 22.

The fluorine-containing graft copolymer of Formula (III) prepared by the method is a graft copolymer of a "semi-fluorinated" alternating copolymer, "Semi-fluorinated" means that at least one of the monomers in the alternating copolymer is a perfluorocarbon monomeric unit.

The underlying principle of this method is that the azido group in the compound of Formula (I) undergoes a click chemical reaction with the alkynyl group in the compound of Formula (II), to produce a 1, 2, 3-triazolyl group, and then the polyethylene glycol segment in the compound of Formula (II) is grafted onto the backbone of the compound of Formula (I).

Preferably, the compound of Formula (I) is prepared by a process including:
under a protective atmosphere, reacting a compound of Formula (A) with an azide in a second organic solvent, in the presence of a phase catalyst at 50-55° C., to obtain the compound of Formula (I) after complete reaction.

The compound of Formula (A) has a structural formula shown below:

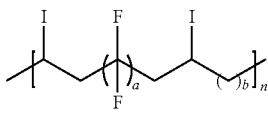

(A)

wherein a=4-8; b=6-8; and n=1-20.

The underlying principle of the method is that the azido group in the azide undergoes nucleophilic substitution with the compound of Formula (A), to replace the iodine atom in the compound of Formula (A), and produce the compound of Formula (I). In view of the problem of difficult separation of a partially azidated linear polymer (for example, the linear fluoropolymer in the present invention) from a high-boiling polar aprotic solvent (DMF, DMSO), phase transfer catalysis is used in the present invention to prepare the compound of Formula (I).

Preferably, the phase catalyst comprises a crown ether compound; and preferably, the crown ether compound includes 18-crown-6 or dicyclohexyl-18-crown-6.

Preferably, the second organic solvent is selected from the group consisting of chloroform, N, N-dimethyl formamide, dimethyl sulfoxide, and any combination thereof.

Preferably, the molar ratio of the compound of Formula (A) to the azide is 1:1-1:40; and the molar ratio of the compound of Formula (A) to the phase catalyst is 1:2-1:80.

Preferably, the molar ratio of the compound of Formula (I) to the compound of Formula (II) is 1:20-1:80.

Preferably, the catalyst is selected from the group consisting of cuprous bromide, cuprous chloride, and cupric sulfate pentahydrate, and any combination thereof; and the ligand comprises pentamethyl diethylenetriamine and/or ascorbic acid.

Preferably, the molar ratio of the compound of Formula (I) to the catalyst is 1:1-1:4; and the molar ratio of the compound of Formula (I) to the ligand is 1:2-1:20.

Preferably, the first organic solvent is selected from the group consisting of toluene, N,N-dimethyl formamide, tetrahydrofuran, and any combination thereof.

In a second aspect, the present invention provides a fluorine-containing graft copolymer, which can be prepared through any method described above. The fluorine-containing graft copolymer comprises a lipophilic chain having a fluorine-containing segment and a hydrophilic chain having a polyethylene glycol segment that is a side chain. The fluorine-containing graft copolymer has a structural formula (III) below:

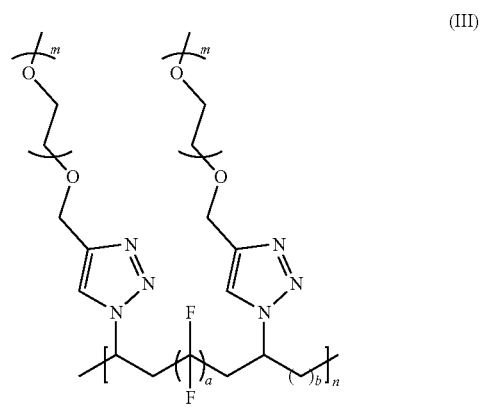

(III)

wherein a=4-8; b-6-8; n=1-20; and m=3-22. Preferably, m=3, 6, 9 or 22.

In a third aspect, the present invention provides use of the fluorine-containing graft copolymer in the preparation of a surfactant.

The fluorine-containing graft copolymer has a lipophilic chain and a hydrophilic chain, and is thus an amphiphilic surfactant. In an aqueous solvent, the lipophilic segment becomes a core, and the hydrophilic segment is surrounded by the solvent as a shell. The lipophilic segment comprises the "semi-fluorinated" alternating copolymers, and the hydrophilic chain comprises the polyethylene glycol segment. Compared to other alkane-based surfactants, the fluorine-containing amphiphilic surfactant can form micelles at a very low concentration, indicating a more excellent performance. Also, the fluorine containing surfactant further has the characteristics of high surface activity, high thermal stability and high chemical stability, thus greatly broadening the application market of fluorine-containing surfactants. The fluorine-containing graft copolymer provided in the present invention can be directly dissolved in water and form spherical micelles at a low concentration, and the surface tension of the aqueous solution decreases with the increase of the concentration of the aqueous solution.

By virtue of the above solutions, the present invention has at least the following advantages.

1. The present invention provides a method for preparing a graft copolymer of a main chain type "semi-fluorinated" alternating copolymer grafted with a polyethylene glycol segment as a side chain. The preparation method has a fast reaction rate, a high grafting rate, and mild reaction conditions, and is suitable for mass production.

2. The graft copolymer of the main chain type "semi-fluorinated" alternating copolymer prepared in the present invention can be used as a surfactant. When used as a surfactant, it has the advantage of forming micelles at a very low concentration, and also has high surface activity, high thermal stability and high chemical stability.

The above description is only a summary of the technical solutions of the present invention. To make the technical means of the present invention clearer and implementable in accordance with the disclosure of the specification, the preferred embodiments of the present invention will be described in detail with reference to the accompanying drawings.

DETAILED DESCRIPTION OF THE PREFERRED EMBODIMENTS

Figure 1:
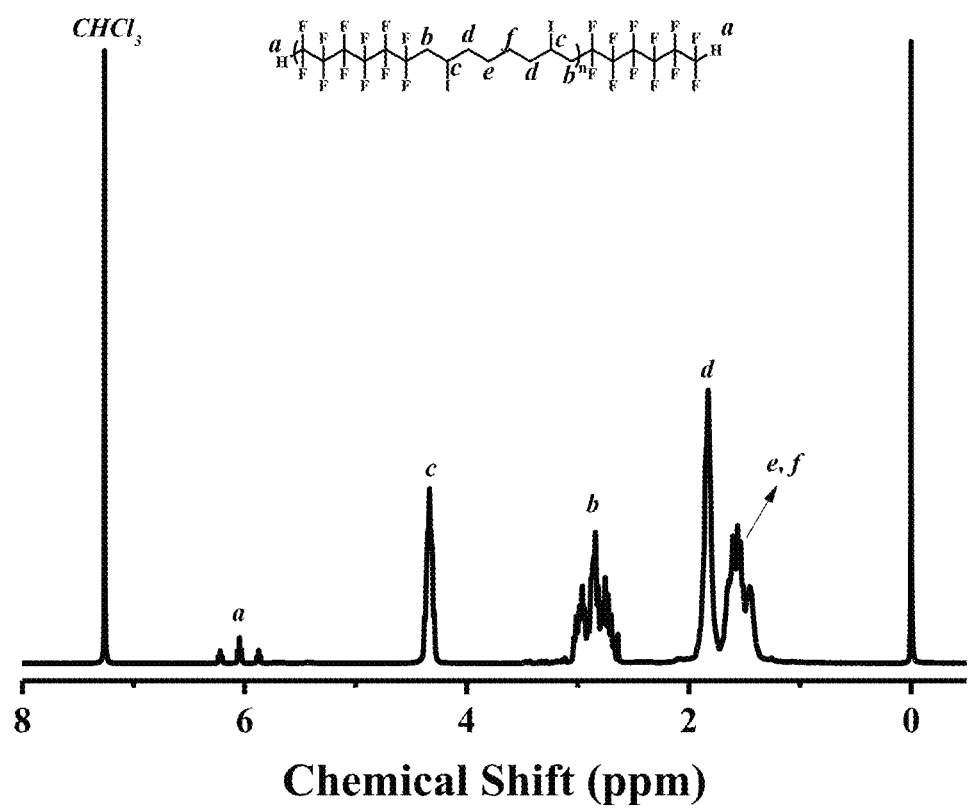
FIG. 1 shows the test results by 1H NMR of a fluorine-containing alternating copolymer $(AB)_n$ prepared in Example 1 of the present invention.

The specific embodiments of the present invention will be described in further detail by way of examples. The following examples are intended to illustrate the present invention, instead of limiting the scope of the present invention.

In the examples of the present invention, only the catalyst cuprous bromide and the ligand pentamethyl diethylene triamine need to be refined before use, and all other chemical reagents are commercially available and used directly.

In the examples of the present invention, the characterization conditions of the product are as follows:

$^1$H NMR and $^{19}$F NMR are performed on INOVA 600 MHz nuclear magnetic spectrometer, where the solvent is CDCl$_3$, and the internal standard is TMS.

Preparation of test samples for $^1$H NMR and $^{19}$F NMR: About 15 mg of the sample is weighed, fed to an NMR tube, and added with 0.6 mL of CDCl$_3$.

Molecular weight ($M_n$) and polydispersity index (PDI): Waters 1515 Gel Permeation chromatography (GPC), mobile phase tetrahydrofuran (THF), and column temperature: 30° C.

Preparation of test samples for GPC: About 10 mg of the sample is weighed, dissolved in 3-4 mL of THF, filtered through a syringe filter after thorough dissolution, and added to a sample vial.

The ultraviolet-visible (UV-vis) absorption spectra are measured on Shimadzu UV-2600 spectrophotometer, and the cloud point (CP) of the aqueous polymer solution is measured in a 1 cm quartz cell at 600 nm.

The surface/interfacial tension of the aqueous solution is tested at room temperature using the BZY-3B automatic meter/interfacial tensiometer.

Preparation of aqueous solution samples: The graft copolymer sample of various weight is weighed, dissolved in 5 mL of an aqueous solution, and stirred for 12 h to fully dissolve it, so as to prepare the sample to be tested.

Example 1: Synthesis of Fluorine-Containing Alternating Copolymer $(AB)_n$ 1,6-Diiodoper-fluorohexane (C$_6$F$_{12}$I$_2$), sodium ascorbate (AsAc—Na), tris(2,2'-bipyridine) ruthenium dichloride (Ru(bpy)3Cl$_2$), methanol (1 mL), 1,4-dioxane (3 mL), 1,7-octadiene (C$_8$H$_{14}$) were sequentially added to a 5 mL ampoule in proportion, wherein [C$_6$F$_{12}$I$_2$]$_0$: [C$_8$H$_{14}$]$_0$: [Ru(bpy)3Cl$_2$]$_0$: [AsAc—Na]$_0$=1.2:1:0.02:0.5 (molar ratio), with 0.5 mmol of 1,6-diiodoper-fluorohexane as a reference. After adding a stir bar, three rounds of freezing-evacuating-introducing argon were performed, and the ampoule was flame-sealed. The ampoule was irradiated under blue LED, and stirred at room temperature. At this time, the solution was bright red, reacted for a predetermined time and then removed, upon which the solution was dark brown. The solution was diluted with 1-2 mL of tetrahydrofuran, precipitated in a large amount of methanol in a disposable plastic cup, sealed with a plastic wrap, and then stood overnight in a freezer. The reaction solution was suction filtered under reduced pressure to obtain a purple-black product, which was dissolved in a small amount of tetrahydrofuran, passed through a neutral alumina column to remove metal salts, and precipitated in a large amount of methanol. The precipitate was white. It was allowed to stand overnight in a freezer, and then suction filtered under reduced pressure. The obtained white product was dried in a constant-temperature vacuum oven at 40° C. to a constant weight and weighed. Finally, a fluorine-containing alternating copolymer $(AB)_n$ was obtained with a yield of 75%. The structure of the fluorine-containing alternating copolymer $(AB)_n$ is shown below:

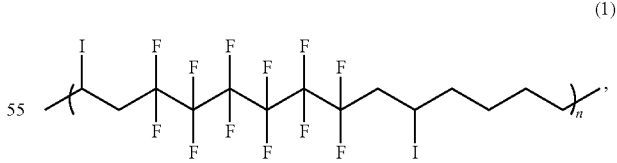

(1)

where n=5-10.

Figure 2:
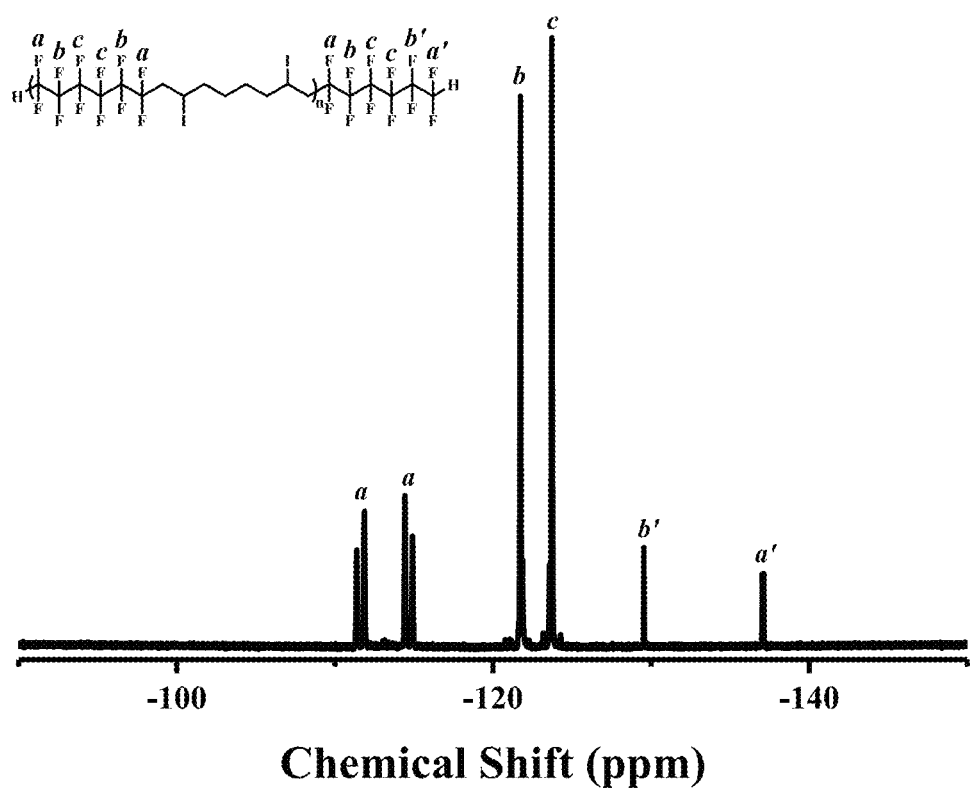
FIG. 2 shows the test results by 19F NMR of the fluorine-containing alternating copolymer $(AB)_n$ prepared in Example 1 of the present invention.

The molecular weight ($M_n$) and polydispersity index (PDI) of the polymer were measured by gel permeation chromatography (GPC), and the structure was characterized by 1H NMR and 19F NMR. The results are shown in FIGS. 1-2. In FIG. 1, the peaks at different chemical shifts on the NMR spectrum can be attributed to corresponding moieties in the structural formula of the polymer. The peak at 7.26 ppm is the shift peak of deuterated chloroform (CDCl$_3$). In FIG. 2, the peaks at different chemical shifts on the NMR spectrum can be attributed to corresponding moieties in the structural formula. The above results show that the expected fluorine-containing alternating copolymer $(AB)_n$ is obtained through the above-mentioned steps.

Example 2: Nucleophilic Substitution of Fluorine-Containing Alternating Copolymer $(AB)_n$ Sodium azide was used as the nucleophilic reagent, the phase catalyst was 18-crown-6, and the nucleophilic reaction gave a fluorine-containing alternating copolymer (AB) $_n$-N$_3$. The reaction route and specific steps were as follows.

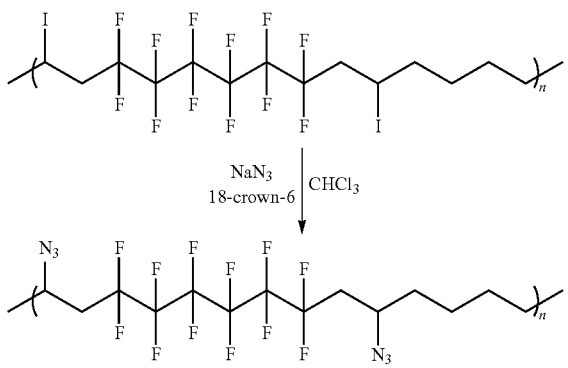

The fluorine-containing alternating copolymer $(AB)_n$ (1.0 eq.) prepared in Example 1, sodium azide (20.0 eq.), 18-crown-6 (40.0 eq.), and chloroform (2.0 mL) were sequentially added to a 5 mL ampoule in proportion. After adding a stir bar, three rounds of freezing-evacuating-introducing argon were performed, and the ampoule was flame-sealed. The ampoule was placed in a heated stirrer at 55° C., stirred, and removed after a predetermined period of time. The ampoule was opened and the solution was diluted with 1 to 2 mL of tetrahydrofuran, which was passed through a neutral alumina column to remove unreacted NaNsandpre-cipitated in a large amount of methanol. Then, it was sealed with a plastic wrap, and stood overnight in a freezer. The reaction solution was suction filtered under reduced pressure to obtain a yellowish product. The obtained yellowish product was dried in a low-temperature vacuum temperature to a constant weight and weighed. Finally, the fluorine-containing alternating copolymer $(AB)_n$-N$_3$ was obtained after nucleophilic substitution.

Figure 3:
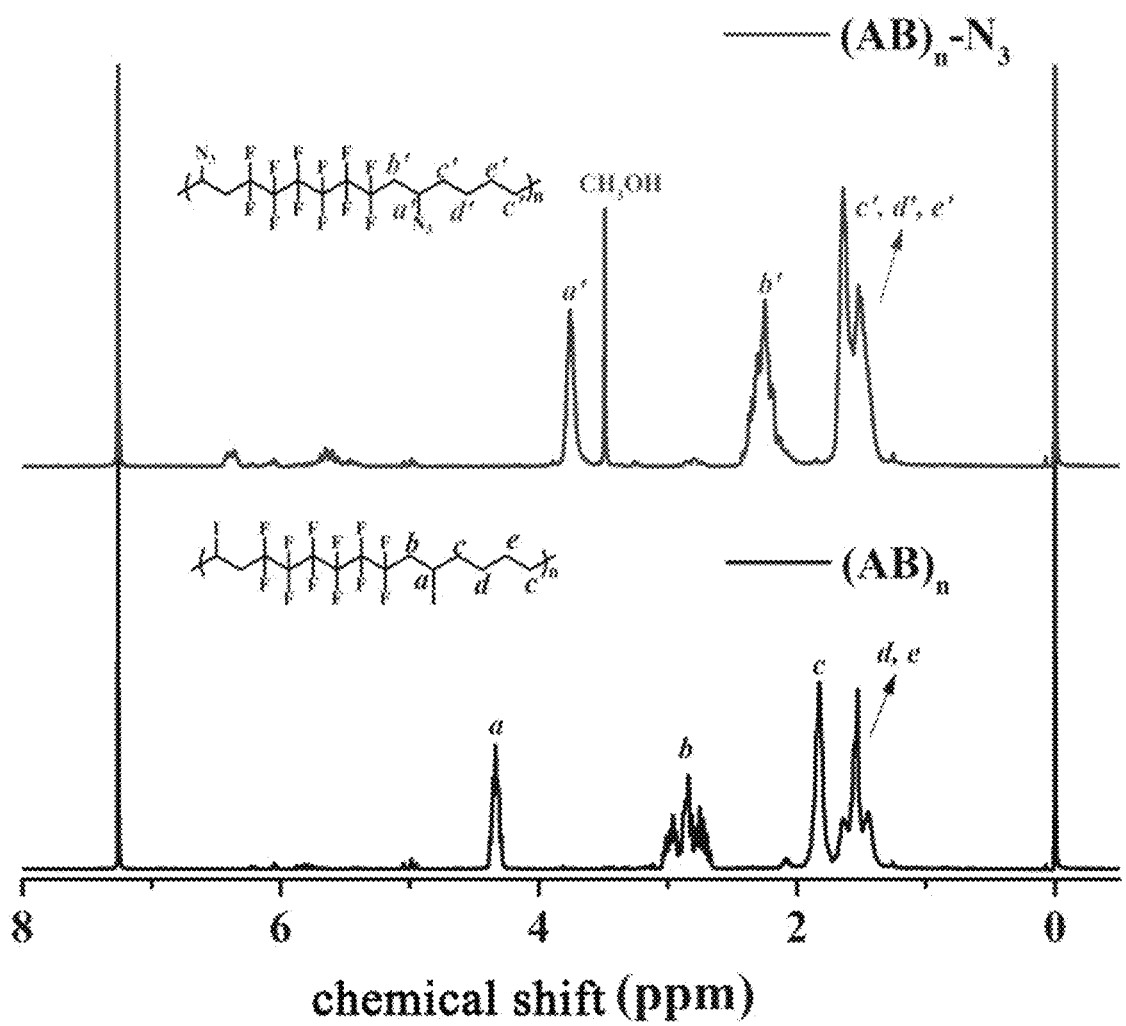
FIG. 3 shows the test results by 1H NMR of a fluorine-containing alternating copolymer $(AB)_n$ before and after nucleophilic substitution in Example 2 of the present invention.

The $^1$H NMR spectra of the polymer before and after nucleophilic substitution are shown in FIG. 3. After C—I is nucleophilic substituted and becomes —N$_3$, the shift peak (4.2-4.4 ppm) originally attributed to —CH$_2$CH(I)CH$_2$— and the shift peak (2.6-3.1 ppm) attributed to —CF$_2$CH$_2$CH (I)— are both shifted toward the high field, and the peaks at other chemical shifts can be attributed to corresponding moieties in the structural formula of the polymer.

Figure 4:
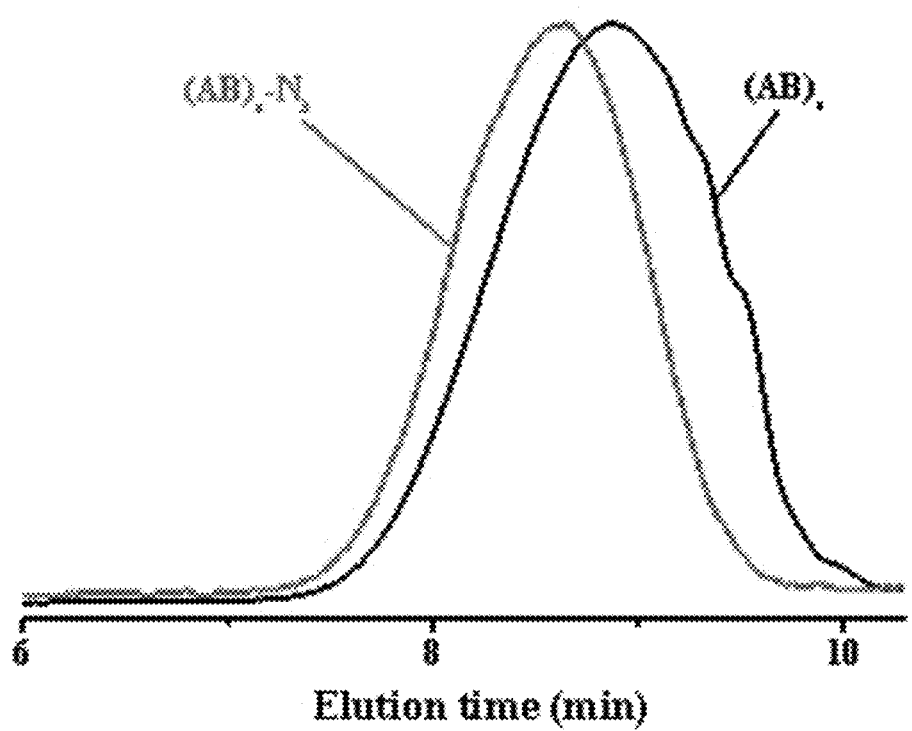
FIG. 4 shows the test results by GPC of the fluorine-containing alternating copolymer $(AB)_n$ before and after nucleophilic substitution in Example 2 of the present invention.

The GPC chromatogram of the copolymer before and after nucleophilic substitution are shown in FIG. 4. As shown by the GPC chromatogram of $(AB)_n$ before and after nucleophilic substitution in FIG. 4, it can be seen that the molecular weight of $(AB)_n$ is 5600 g/mol, and Mw/M$_n$=1.43; and the molecular weight of the product after substitution is 8400 g/mol, and Mw/M$_n$=1.25.

Figure 5:
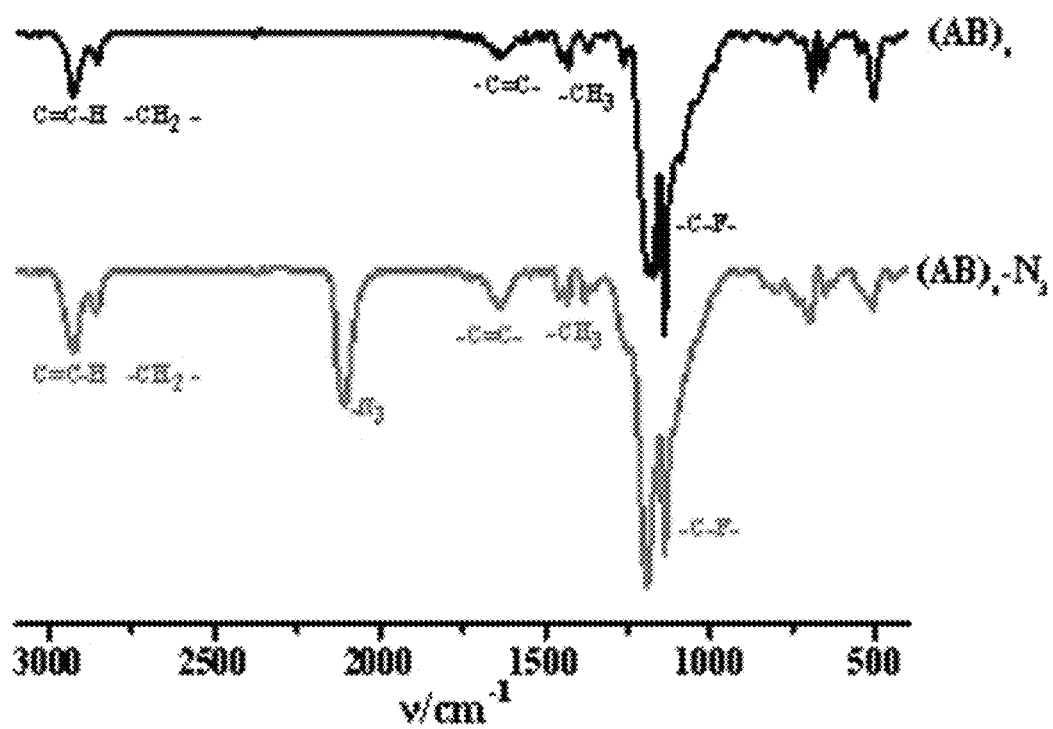
FIG. 5 shows the test results by FT-IR of the fluorine-containing alternating copolymer $(AB)_n$ before and after nucleophilic substitution in Example 2 of the present invention.

The FT-IR spectra of the polymer before and after nucleophilic substitution are shown in FIG. 5. After nucleophilic substitution, the infrared absorption of —N$_3$ at 2110 cm$^{-1}$ is clearly shown in the spectra, confirming the successful synthesis of nucleophilic substituted product.

Example 3. Synthesis of Graft Copolymer of Main Chain Type "Semi-Fluorinated" Alternating Copolymer The fluorine-containing alternating copolymer $(AB)_n$—N$_3$ (1.0 eq.) obtained after nucleophilic substitution prepared in Example 2, OMEG having a polyethylene glycol segment and a terminal alkynyl group (20.0 eq.), cuprous bromide (2.0 eq.), pentamethyldiethylenetriamine (PMDETA) (2.0 eq.), and tetrahydrofuran (2.0 mL) were sequentially added to a 5 mL ampoule in proportion. After adding a stir bar, three rounds of freezing-evacuating-introducing argon were performed, and the ampoule was flame-sealed. The ampoule was placed in a heated stirrer at 25° C., stirred, and removed after a predetermined period of time. The ampoule was opened, and the solution was diluted with 1 to 2 mL of tetrahydrofuran, passed through a neutral alumina column to remove the metal salt catalyst, precipitated in a large amount of petroleum ether, sealed with a plastic wrap and then allowed to settle down overnight at room temperature. On the following day, the supernatant was decanted, and the polymer was dried in a constant-temperature vacuum oven at 40° C. to a constant weight and weighed. Finally, the graft copolymer $(AB)_n$-g-OMEG with main chain type "semi-fluorinated" alternating copolymer backbone was obtained.

Figure 6:
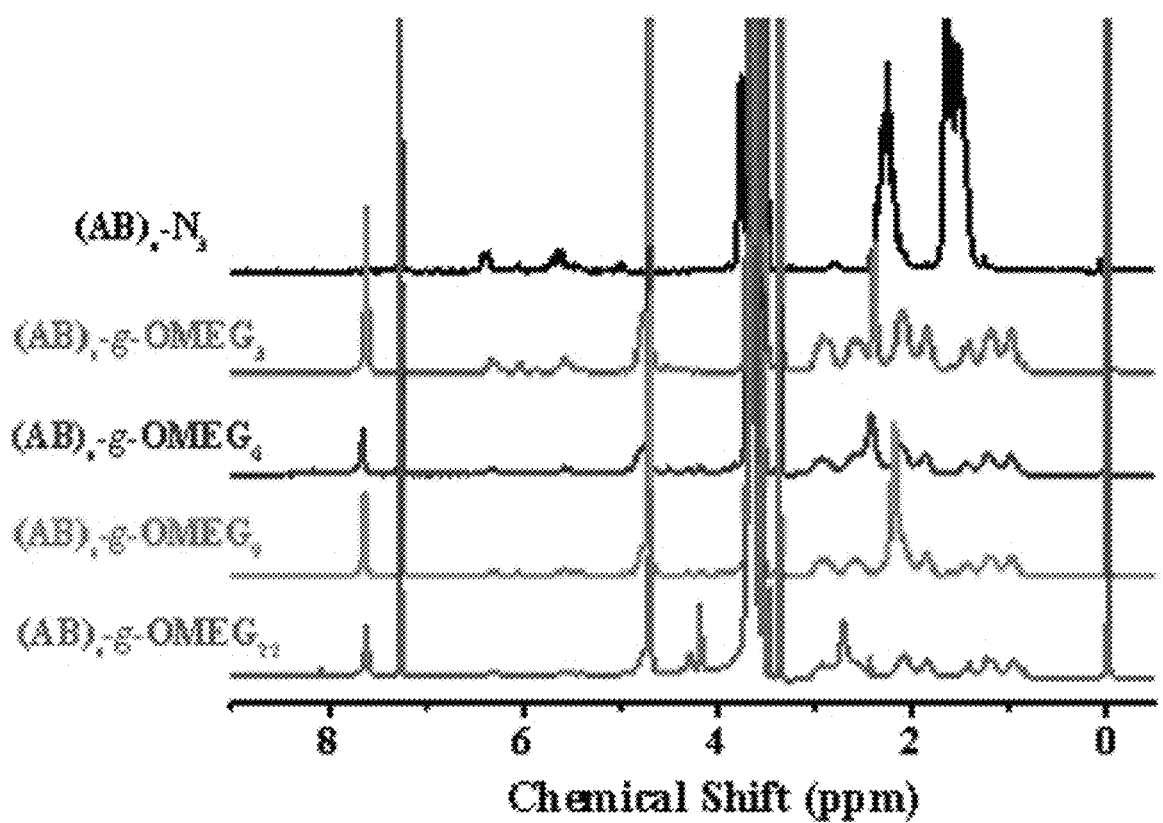
FIG. 6 shows the test results by 1H NMR of a nucleophilic substitution product before and after click reaction in Example 3 of the present invention.

The 1H NMR spectra of the graft copolymers before and after reaction are shown in FIG. 6. After the reaction, the appearance of the chemical shift of 7.59 ppm indicates the successful addition of the azido group to the alkynyl group, and the chemical shifts of 4.69 ppm, 3.67 ppm and 3.36 ppm also correspond to the structures on the OMEG chain. These experimental results all successfully demonstrate the successful synthesis of the graft copolymers.

Figure 7:
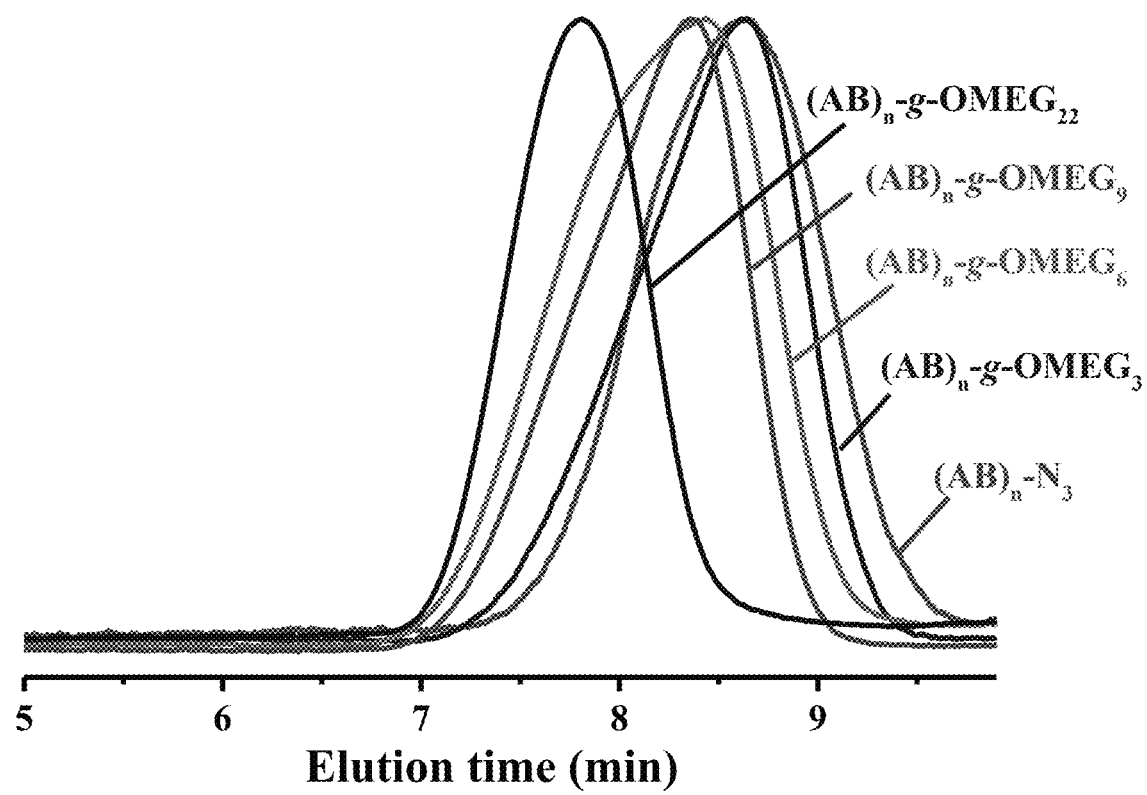
FIG. 7 shows the test results by GPC of the nucleophilic substitution product before and after click reaction in Example 3 of the present invention.

The GPC traces of the graft copolymers $(AB)_n$-g-OMEG before and after reaction are shown in FIG. 7. After the "click" reaction, the molecular weight of the polymer is increased, and the GPC traces shows the single peak and shifted toward higher molecular weight. The specific results are shown in Table 1.

TABLE 1

"Click" reaction of fluorine-containing alternating copolymer $(AB)_n$-N$_3$ with OMEG of different chain lengths

| Entry | M | $^a$[(AB)$_n$-N$_3$]$_0$:[OMEG]$_0$: [CuBr]$_0$:[PMDETA]$_0$ | T (° C.) | $^b$M$_{n,GPC}$ (g/mol) | $^b$M$_w$/M$_n$ |
|---|---|---|---|---|---|
| 1 | OMEG$_3$ | 1:20:2:2 | 25 | 9700 | 1..25 |
| 2 | OMEG$_6$ | 1:20:2:2 | 25 | 12600 | 1.29 |
| 3 | OMEG$_9$ | 1:20:2:2 | 25 | 13300 | 1.22 |
| 4 | OMEG$_{22}$ | 1:20:2:2 | 50 | 21000 | 1.14 |

Reaction conditions: m$_{(AB)_n}$-N$_3$=0.1 g, M$_{(AB)_n}$-N$_2$=8400 g/mol, M$_w$/M$_n$=1.25. V$_{THF}$=2 mL, t=24 h. "Riato=[(AB)$_n$-N$_3$]$_0$: [OMEG]$_0$: [CuBr]$_0$: [PMDETA]$_0$. b Molecular weight and molecular weight distribution measured by GPC (using linear PMMA in THF as standard).

In this embodiment, the structural formula OMEG is shown below:

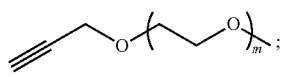

As shown in Table 1, OMEG$_3$, OMEG$_6$, OMEG$_9$, and OMEG$_{22}$ have an m of 3, 6, 9, and 22 respectively. In FIGS. 6-10, (AB)$_n$-g-OMEG$_3$, (AB)$_n$-g-OMEG$_6$, (AB)$_n$-g-OMEG$_9$ and (AB)$_n$-g-OMEG$_{22}$ are respectively corresponding products prepared with OMEG$_3$, OMEG$_6$, OMEG$_9$, and OMEG$_{22}$.

Figure 8:
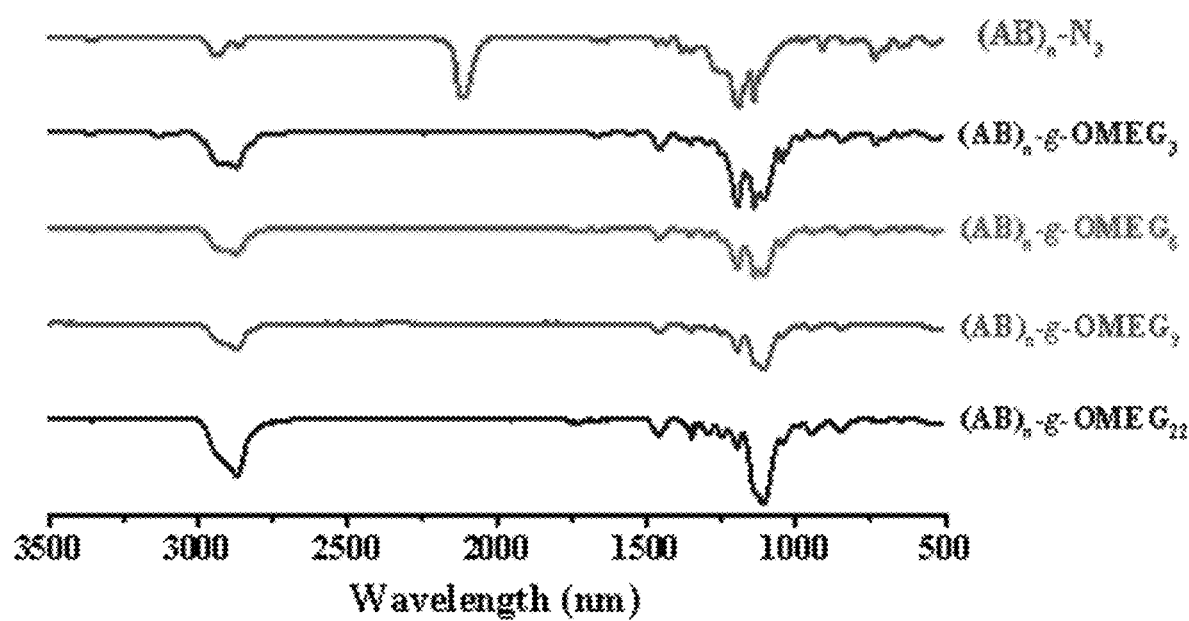
FIG. 8 shows the test results by FT-IR of the nucleophilic substitution product before and after click reaction in Example 3 of the present invention.

The FT-IR spectra of the graft copolymers (AB)$_n$-g-OMEG before and after reaction are shown in FIG. 8. After the reaction, the previous infrared absorption of —N$_3$ (at 2110 cm-1) disappears completely, confirming the success of the "Click" reaction.

Figure 9:
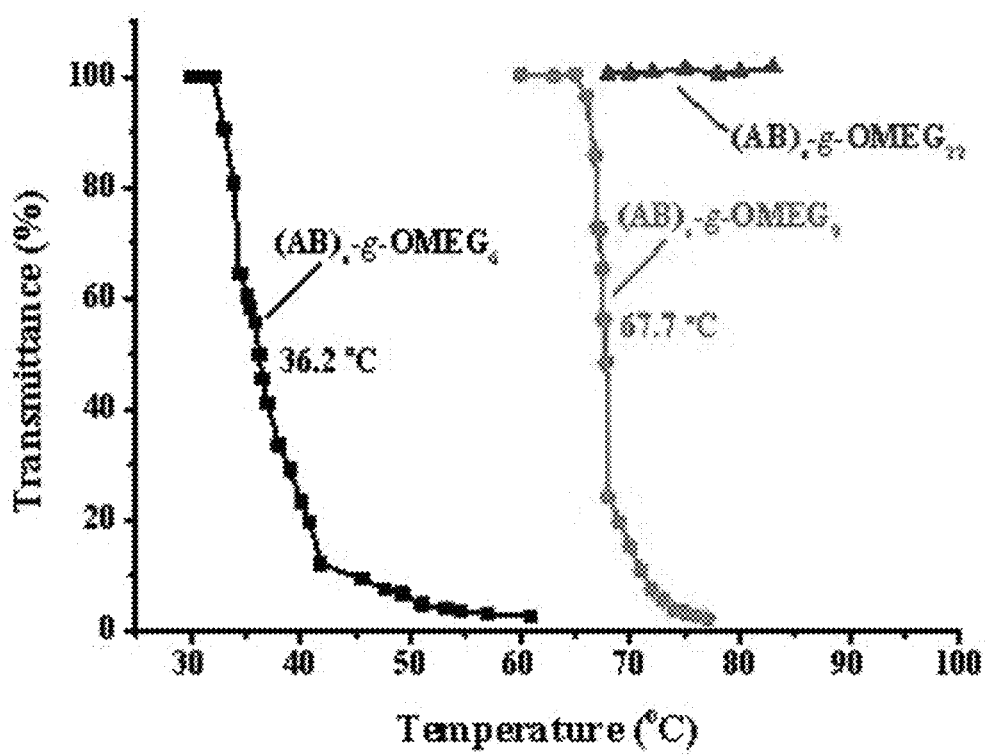
FIG. 9 shows the test results by UV-vis spectroscopy of an aqueous solution of a fluorine-containing graft copolymer after heating.

Example 4. Use of Graft Copolymer of Main Chain Type "Semi-Fluorinated" Alternating Copolymer in the Preparation of Surfactants The UV-vis absorption spectra of the aqueous solutions of (AB)$_n$-g-OMEG$_6$, (AB)$_n$-g-OMEG$_9$, and (AB)$_n$-g-OMEG$_{22}$ prepared in Example 3 are shown in FIG. 9. The sample concentration of each aqueous solution is 2.0 mg/mL. The corresponding cloud points of (AB)$_n$-g-OMEG$_6$ and (AB)$_n$-g-OMEG, are respectively 36.2° C. and 67.7° C. It can be seen that with the growth of the side chain, the cloud point (CP) also increases accordingly, until no cloudy phenomenon is observed within the test limits.

Figure 10:
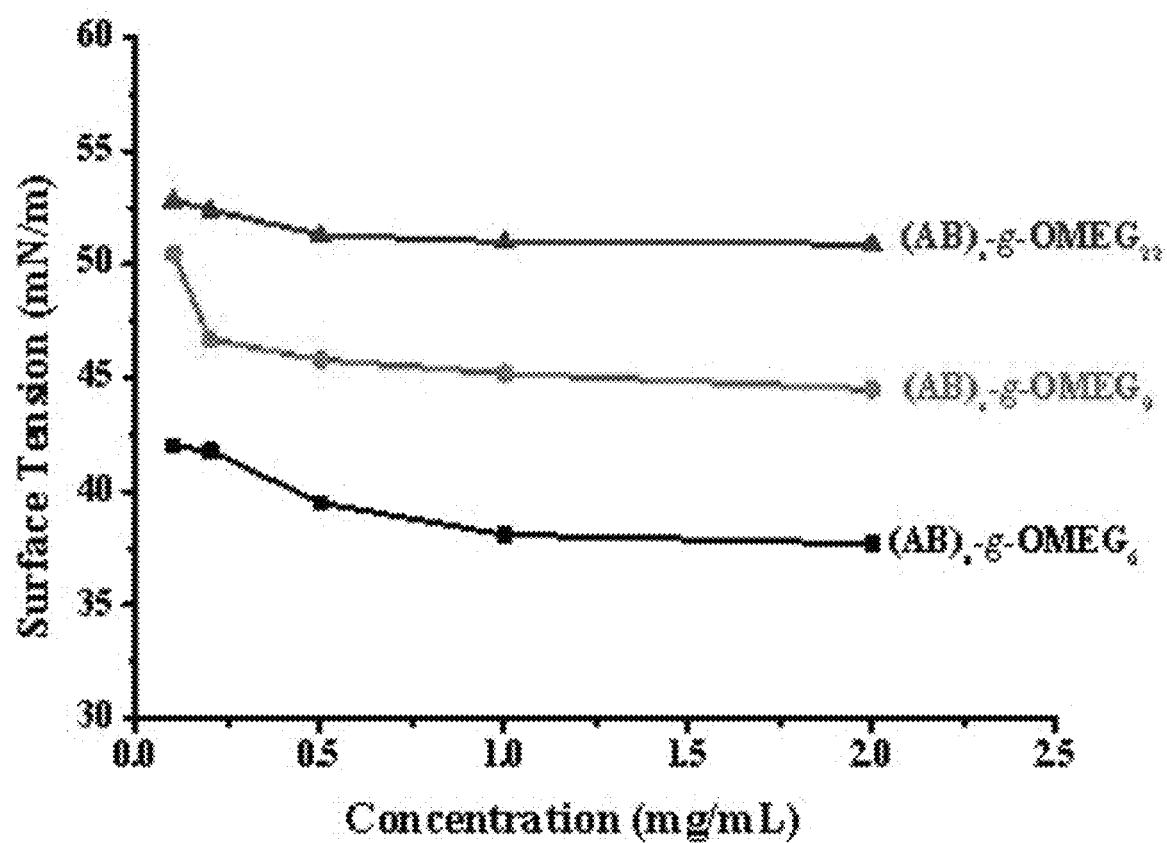
FIG. 10 shows the test results of surface tension of the aqueous solution of the fluorine-containing graft copolymer at room temperature.

The surface tension test results of the aqueous solution of the graft copolymer prepared in Example 3 are shown in FIG. 10. The surface tension of the aqueous solution decreases with the increase of the concentration of each sample, and approaches a limit. In addition, compared with (AB)$_n$-g-OMEG$_9$, and (AB)$_n$-g-OMEG$_{22}$, (AB)$_n$-g-OMEG$_6$ has better performance as a surfactant, which also correlates with the length of the side chain. Samples with a shorter side chain has a more potent ability to reduce the surface tension of the aqueous solution at the same test concentration.

While preferred embodiments of the present invention have been described above, the present invention is not limited thereto. It should be noted that some improvements and variations can be made by those skilled in the art without departing from the technical principles of the present invention, which are also contemplated in the protection scope of the present invention.

What is claimed is:

1. A method for preparing a fluorine-containing graft copolymer, comprising steps of: under a protective atmosphere, reacting a compound of Formula (I) and a compound of Formula (II) in a first organic solvent in the presence of a catalyst and a ligand at 20-30° C., to obtain the fluorine-containing graft copolymer of Formula (III), wherein the compounds of Formulas (I) and (II), and the fluorine-containing graft copolymers of Formula (III) have a structural formula shown below:

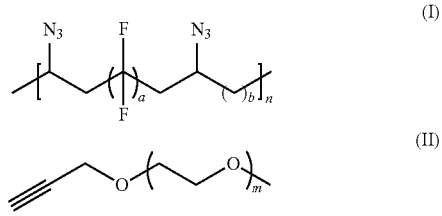

(I)

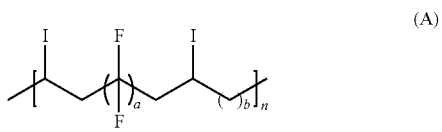

(II)

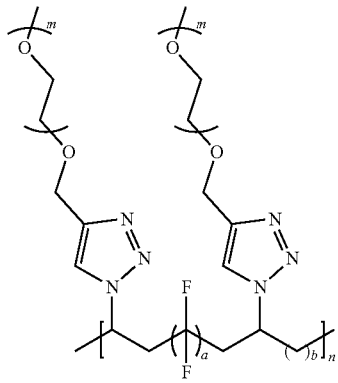

(III)

wherein a=4-8; b=6-8; n=1-20; and m=3-22.

2. The preparation method according to claim 1, wherein the compound of Formula (I) is prepared by a process comprising:
under a protective atmosphere, reacting a compound of Formula (A) with an azide in a second organic solvent, in the presence of a phase catalyst at 50-55° C., to obtain the compound of Formula (I),
wherein the compound of Formula (A) has a structural formula of:

(A)

wherein a=4-8; b=6-8; and n=1-20.

3. The preparation method according to claim 2, wherein the phase catalyst comprises a crown ether compound; and the second organic solvent is selected from the group consisting of chloroform, N, N-dimethyl formamide, dimethyl sulfoxide and any combination thereof.

4. The preparation method according to claim 2, wherein the molar ratio of the compound of Formula (A) to the azide is 1:1-1:40; and the molar ratio of the compound of Formula (A) to the phase catalyst is 1:2-1:80.

5. The preparation method according to claim 1, wherein the molar ratio of the compound of Formula (I) to the compound of Formula (II) is 1:20-1:80.

6. The preparation method according to claim 1, wherein the catalyst is selected from the group consisting of cuprous bromide, cuprous chloride, cupric sulfate pentahydrate and any combination thereof; and the ligand comprises pentamethyl diethylenetriamine and/or ascorbic acid.

7. The preparation method according to claim 1 or 6, wherein the molar ratio of the compound of Formula (I) to the catalyst is 1:1-1:4; and the molar ratio of the compound of Formula (I) to the ligand is 1:2-1:20.

8. The preparation method according to claim 1, wherein the first organic solvent is selected from the group consisting of toluene, N, N-dimethyl formamide, and tetrahydrofuran and any combination thereof.

9. A fluorine-containing graft copolymer prepared by the method according to claim 1, wherein the fluorine-containing graft copolymer comprises a lipophilic chain having a fluorine-containing segment and a hydrophilic chain having a polyethylene glycol segment, the polyethylene glycol segment is a side chain; and the fluorine-containing graft copolymer has a structural formula (III):
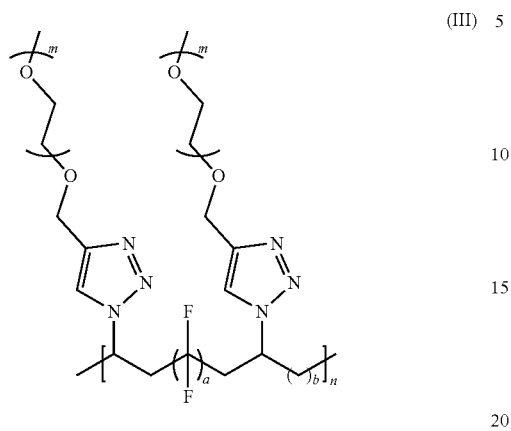
(III)
wherein a=4-8; b=6-8; n=1-20; and m=3-22.
10. A method for preparation of a surfactant comprising providing the fluorine-containing graft copolymer according to claim 9 and utilizing the fluorine-containing graft copolymer to form the surfactant.
* * * * *